US012789937B2

(12) United States Patent
Nooner et al.

(10) Patent No.: US 12,789,937 B2
(45) Date of Patent: Nov. 10, 2026

(54) ONCOMING VEHICLE ALERT SYSTEM

(71) Applicant: Midwest Innovative Products, LLC, Joliet, IL (US)

(72) Inventors: Bryan Nooner, Joliet, IL (US); Robert Zajeski, Homer Glen, IL (US)

(73) Assignee: Midwest Innovative Products, LLC

( * ) Notice: Subject to any disclaimer, the term of this patent is extended or adjusted under 35 U.S.C. 154(b) by 0 days.

(21) Appl. No.: 19/259,711

(22) Filed: Jul. 3, 2025

(65) Prior Publication Data

US 2025/0326455 A1 Oct. 23, 2025

Related U.S. Application Data

(63) Continuation of application No. 18/936,007, filed on Nov. 4, 2024, now Pat. No. 12,377,930.

(Continued)

(51) Int. Cl.

*B62J 50/25* (2020.01)
*F21S 9/02* (2006.01)

(Continued)

(52) U.S. Cl.

CPC ................. *B62J 50/25* (2020.02); *F21S 9/02* (2013.01); *F21S 43/14* (2018.01); *F21S 43/237* (2018.01);

(Continued)

(58) Field of Classification Search

CPC ........... G08G 1/0145; B62J 50/25; A63C 5/08

See application file for complete search history.

(56) References Cited

U.S. PATENT DOCUMENTS 9,153,153 B1 10/2015 Rothstein
10,239,445 B1 * 3/2019 Hendricks ............ H04N 9/3141

(Continued)

OTHER PUBLICATIONS

Canadian Intellectual Property Office, Examination Search Report regarding Canadian Application No. 3,252,058 mailed Nov. 13, 2025 (4 pages).

*Primary Examiner* — Eric T Eide

(74) *Attorney, Agent, or Firm* — MCANDREWS HELD & MALLOY, LTD

(57) ABSTRACT

According to embodiments, an apparatus for mounting on a vehicle includes: a mount configured to attach to the vehicle; a body coupled with the mount, wherein the body includes an upward-facing side and an rearward-facing side; a circuit board positioned within the body; a processor mounted on the circuit board, wherein the processor is configured to receive power from a battery; a display mounted on the circuit board, and including a first group of segments and a second group of segments, wherein each of the segments comprises an LED, wherein the display is configured to receive power from the battery and to receive signals from the processor, wherein the signals dynamically control an illumination pattern of the segments, wherein the segments are mounted on the circuit board, wherein the first group of segments is configured to illuminate patterns of the segments corresponding to different numbers, wherein the second group of segments is configured to illuminate a pattern of the segments corresponding to at least one word; a power indicator mounted on the circuit board and configured to illuminate in a manner corresponding to a charge level of the battery; a lens configured to cover the display; and a user interface, wherein the user interface communicates with the processor and is configured to control the display.

20 Claims, 11 Drawing Sheets

Related U.S. Application Data

(60) Provisional application No. 63/595,901, filed on Nov. 3, 2023.

(51) Int. Cl.

| | |
|---|---|
| ***F21S 43/14*** | (2018.01) |
| ***F21S 43/237*** | (2018.01) |
| ***F21V 23/04*** | (2006.01) |
| ***F21W 107/10*** | (2018.01) |

(52) U.S. Cl.

CPC ..... *F21V 23/0464* (2013.01); *F21W 2107/10* (2018.01)

(56) References Cited

U.S. PATENT DOCUMENTS

| | | | | |
|---|---|---|---|---|
| 2005/0024884 | A1 | 2/2005 | Seminara et al. | |
| 2005/0063194 | A1* | 3/2005 | Lys | H05B 47/184 362/489 |
| 2005/0232469 | A1* | 10/2005 | Schofield | B60Q 9/008 382/104 |
| 2006/0158323 | A1* | 7/2006 | Pattison | B60Q 1/444 340/436 |
| 2014/0118553 | A1* | 5/2014 | Diba | G08G 1/087 348/149 |
| 2015/0054660 | A1* | 2/2015 | Simmons | G06F 9/30 340/908 |
| 2015/0055360 | A1* | 2/2015 | Hollingworth | B60Q 1/2607 362/511 |
| 2015/0062865 | A1 | 3/2015 | Liao et al. | |
| 2017/0043709 | A1 | 2/2017 | Dellock et al. | |
| 2020/0039422 | A1 | 2/2020 | Wornham | |
| 2023/0235871 | A1* | 7/2023 | Hallitschke | F21S 43/14 362/511 |

* cited by examiner

ONCOMING VEHICLE ALERT SYSTEM

CROSS REFERENCE TO RELATED APPLICATIONS

This application is a continuation of, and claims priority to and the benefit of U.S. application Ser. No. 18/936,007, filed on Nov. 4, 2024, and U.S. Prov. Appl. No. 63/595,901, filed on Nov. 3, 2023, the entireties of which are incorporated by reference herein.

BACKGROUND

Generally, this application relates to devices that mount on a vehicle, such as a snowmobile (also referred to as a "sled," herein). For example, snowmobiles may travel along trails or paths with two-way traffic. The drivers may not know how many snowmobiles are behind the other driver.

SUMMARY

According to embodiments, an apparatus for mounting on a vehicle is provided, wherein the apparatus is further for alerting an oncoming vehicle operator as to the presence of a certain number of additional vehicles behind the vehicle, the apparatus comprising: a body including an upward-facing side and an rearward-facing side; a processor configured to receive power from a battery; a display including a first group of segments and a second group of segments, wherein each of the segments comprises an LED, wherein the display is configured to receive power from the battery and to receive signals from the processor, wherein the signals dynamically control an illumination pattern of the segments, wherein the segments are mounted on the circuit board, wherein the first group of segments is configured to illuminate patterns of the segments corresponding to different numbers, wherein the second group of segments is configured to illuminate a pattern of the segments corresponding to at least one word; a lens configured to cover the display; and a user interface, wherein the user interface communicates with the processor and is configured to control the display. The apparatus may further include a mount configured to attach to the vehicle, wherein the body is coupled with the mount such that a position of the body is adjustable with respect to the vehicle. At least one segment in the first group of segments may be shared with the second group of segments. A height of the first group of segments may be greater than a height of the second group of segments. The signals may cause the first group of segments and the second group of segments to illuminate in an alternating manner. The first group of segments and the second group of segments may alternate at a period, wherein the period is no longer than approximately one second per group. The lens may further include a display light pipe configured to direct light from the display to a forward-facing surface of the lens. The lens may further include a power indicator light pipe configured to direct light from the power indicator to an upward-facing surface or a rearward-facing surface of the lens. The lens may include an opaque region in a region where there is no light pipe, wherein the opaque region is configured to obscure the appearance of structure behind the lens. The lens may be textured to form the opaque region. The user interface may be disposed on the rearward-facing side of the body. The user interface may include a power button configured to selectively turn the display ON or OFF. The user interface may include a number-adjusting mechanism configured to cause the processor to communicate signals to the display to adjust the pattern displayed on the first group of segments such that an adjusted number is displayed. The number-adjusting mechanism may include an increment button and a decrement button. The apparatus may further include a light sensor configured to detect an amount of ambient light and correspondingly adjust a brightness level of the display.

According to embodiments, an apparatus for mounting on a vehicle, is for alerting an oncoming vehicle operator as to the presence of a certain number of additional vehicles behind the vehicle. The apparatus may include: a mount configured to attach to the vehicle; a body coupled with the mount, wherein the body includes an upward-facing side and an rearward-facing side; a circuit board positioned within the body; a processor mounted on the circuit board, wherein the processor is configured to receive power from a battery; a display mounted on the circuit board, and including a first group of segments and a second group of segments, wherein each of the segments comprises an LED, wherein the display is configured to receive power from the battery and to receive signals from the processor, wherein the signals dynamically control an illumination pattern of the segments, wherein the segments are mounted on the circuit board, wherein the first group of segments is configured to illuminate patterns of the segments corresponding to different numbers, wherein the second group of segments is configured to illuminate a pattern of the segments corresponding to at least one word; a power indicator mounted on the circuit board and configured to illuminate in a manner corresponding to a charge level of the battery; a lens configured to cover the display; and a user interface, wherein the user interface communicates with the processor and is configured to control the display. The body may be coupled with the mount such that a position of the body is adjustable with respect to the vehicle. At least one segment in the first group of segments may be shared with the second group of segments. A height of the first group of segments may be greater than a height of the second group of segments. The signals may cause the first group of segments and the second group of segments to illuminate in an alternating manner. The first group of segments and the second group of segments may alternate at a period, wherein the period is no longer than approximately one second per group. The lens may further include a display light pipe configured to direct light from the display to a forward-facing surface of the lens. The lens may further include a power indicator light pipe configured to direct light from the power indicator to an upward-facing surface or a rearward-facing surface of the lens. The lens may include an opaque region in a region where there is no light pipe, wherein the opaque region is configured to obscure the appearance of structure behind the lens. The lens may be textured to form the opaque region. The user interface may be disposed on the rearward-facing side of the body. The user interface may include a power button configured to selectively turn the display ON or OFF. The user interface may include a number-adjusting mechanism configured to cause the processor to communicate signals to the display to adjust the pattern displayed on the first group of segments such that an adjusted number is displayed. The number-adjusting mechanism may include an increment button and a decrement button. The apparatus may further include a light sensor configured to detect an amount of ambient light and correspondingly adjust a brightness level of the display.

According to embodiment, an apparatus for mounting on a vehicle is for alerting an oncoming vehicle operator as to the presence of a certain number of additional vehicles behind the vehicle. The apparatus may include: a mount configured to attach to the vehicle, wherein the mount is adjustable; a body coupled with the mount such that the body is adjustable with respect to the vehicle, wherein the body includes an upper side and an operator-facing side; a circuit board positioned within the body; a processor mounted on the circuit board, wherein the processor is configured to receive power from a battery; a display mounted on the circuit board, and including a first group of segments and a second group of segments, wherein each of the segments comprises an LED, wherein the display is configured to receive power from the battery and to receive signals from the processor, wherein the signals dynamically control an illumination pattern of the segments, wherein the segments are mounted on a circuit board, wherein the first group of segments is configured to illuminate patterns of the segments corresponding to different numbers, wherein the second group of segments is configured to illuminate a pattern of the segments corresponding to at least one word, wherein at least one segment in the first group of segments is shared with the second group of segments, wherein a height of the first group of segments is greater than a height of the second group of segments, wherein the signals cause the first group of segments and the second group of segments to illuminate in an alternating manner, wherein the first group of segments and the second group of segments alternate at a period, wherein the period is no longer than approximately one second per group; a power indicator mounted on the circuit board and configured to illuminate in a manner corresponding to a charge level of the battery; a lens configured to cover the display, and including a display light pipe and a power indicator light pipe, wherein the display light pipe is configured to direct light from the display to a forward-facing surface of the lens, wherein the power indicator light pipe is configured to direct light from the power indicator to an upward-facing surface or a rearward-facing surface of the lens, wherein the lens comprises an opaque region in an area where there is no light pipe, wherein the opaque region is configured to obscure the appearance of structure behind the lens; and a user interface disposed on the rearward-facing side of the body, wherein the user interface communicates with the processor, wherein the user interface includes a power button, an increment button, and a decrement button, wherein the power button is configured to selectively turn the display ON and OFF, wherein the increment button is configured to cause the processor to generate a signal for the first group of segments in the display to increase the number such that a different pattern is illuminated, wherein the decrement button is configured to cause the processor to generate a signal for the first group of segments in the display to decrease the number such that a different pattern is illuminated, wherein the buttons comprise push buttons. The light sensor may be configured to detect an amount of ambient light and correspondingly adjust a brightness level of the display. The apparatus may further include a port configured for charging the battery. The body and the mount may be coupled with a rail system. The lens may be textured to form the opaque region.

Figure 1:
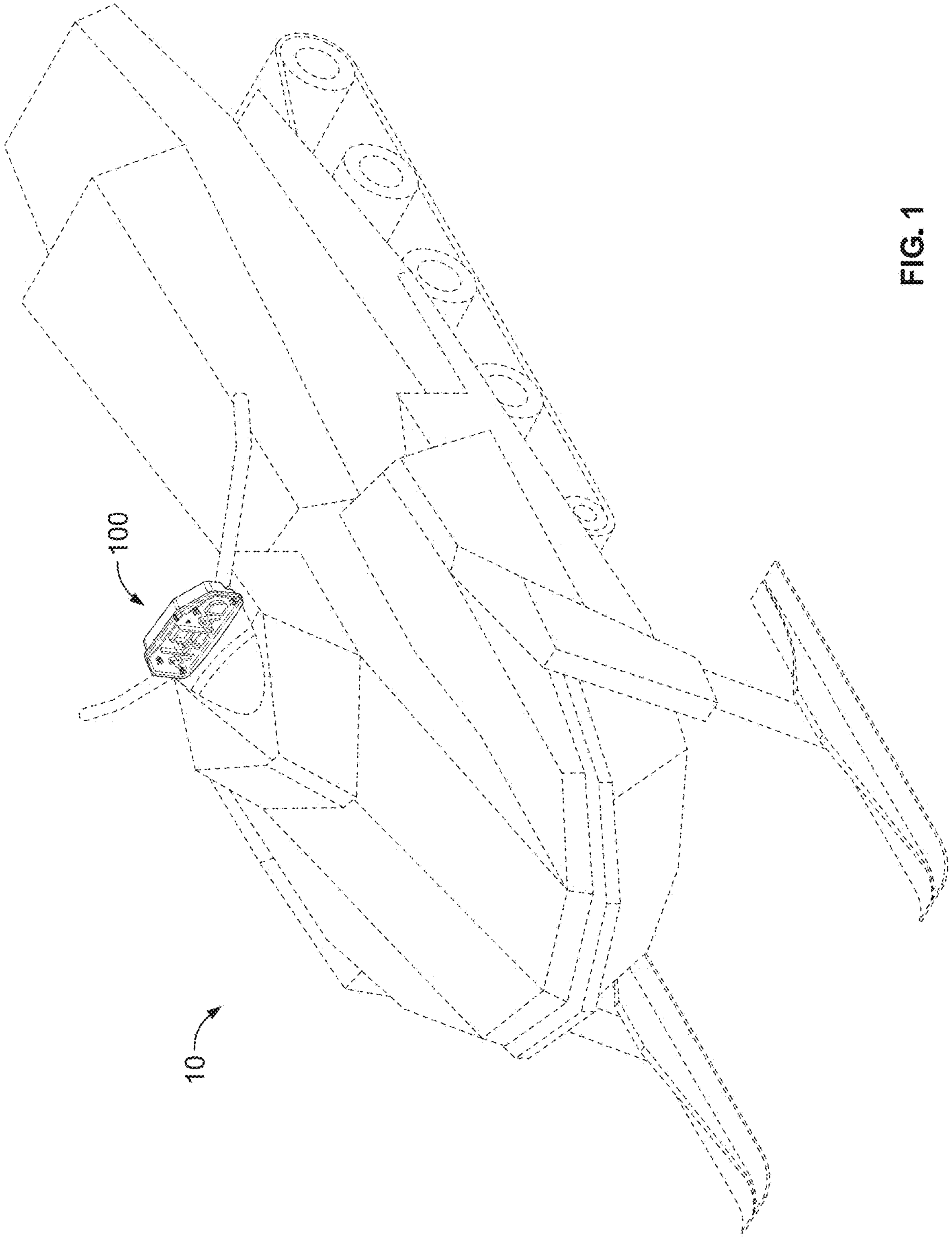
FIG. 1 illustrates an alert device mounted to a snowmobile, according to embodiments.
Figure 2:
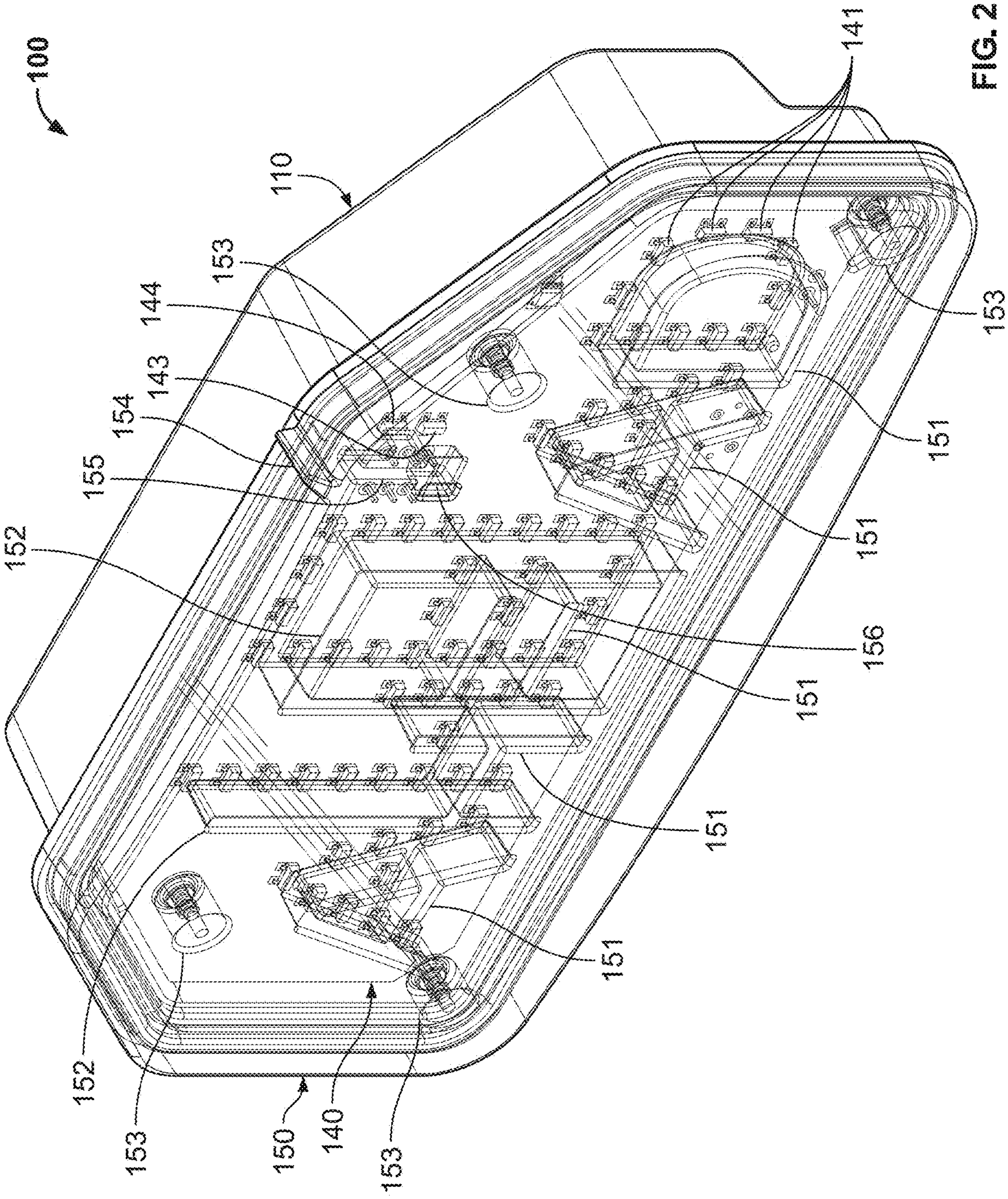
FIG. 2 illustrates a front perspective view of an alert device, according to embodiments.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

DETAILED DESCRIPTION

Snowmobile trails may be relatively narrow, for example, only wide enough for two vehicles. This width may allow for two-way traffic. Snowmobiles may travel in groups, for example, in a single-file line. It may be useful for a snowmobile driver moving in the opposite direction to know how many snowmobiles are in the group. It may be useful for safety reasons, such as: avoiding accidents due to not knowing the oncoming number of riders after passing a single rider; alerting passing drivers that they can safely increase speed; or encouraging oncoming drivers to slow down. Embodiments disclosed herein provide for a vehicle-mounted device that alerts an oncoming snowmobile driver as to the number of additional snowmobiles that are "ahead"—i.e., the number of snowmobiles that are behind the snowmobile to which the device is attached. Speeding is a leading cause of snowmobile accidents, and knowing the number of riders after the lead rider may alert the oncoming rider to reduce speed.

Figure 3:
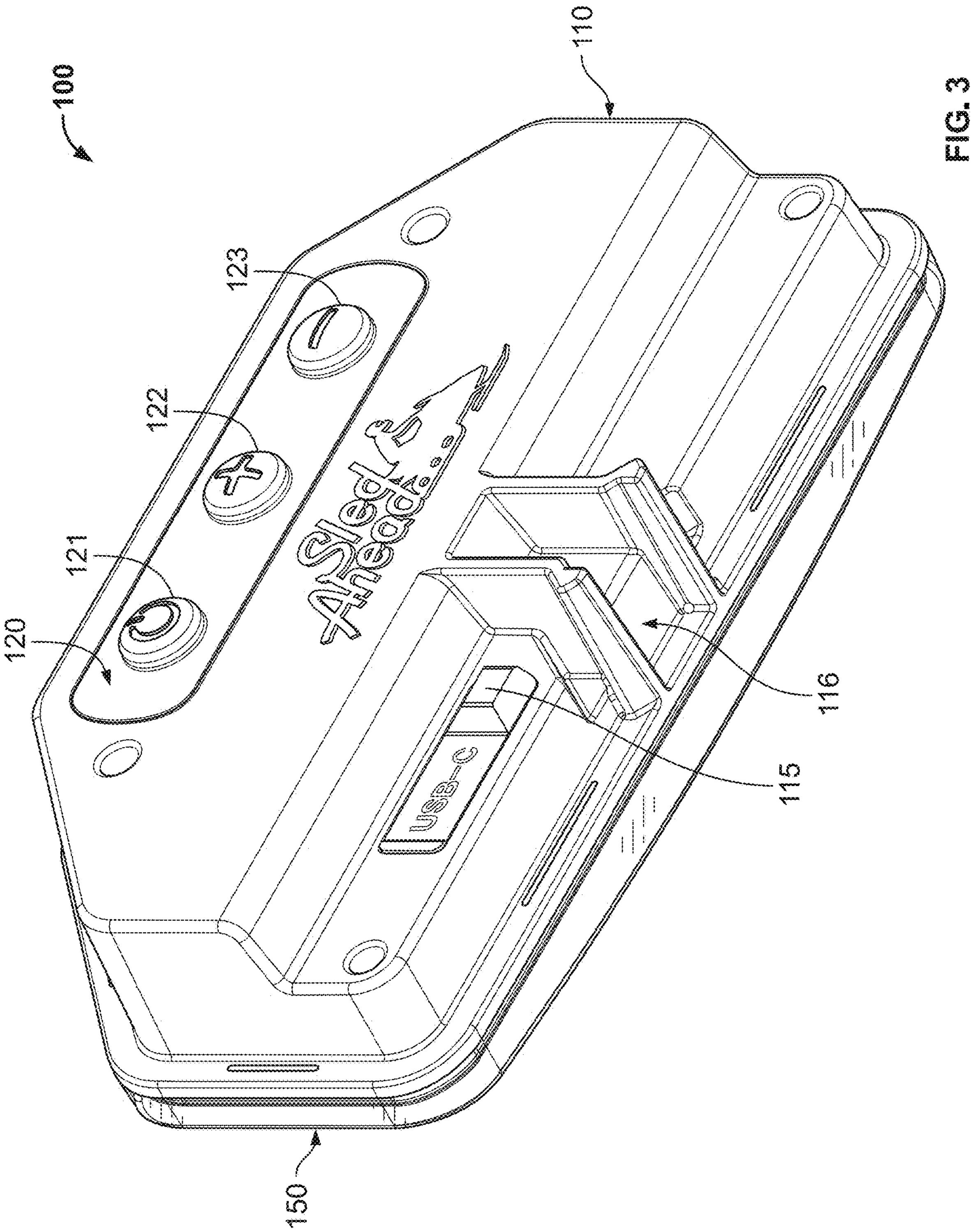
FIG. 3 illustrates a rear perspective view of an alert device, according to embodiments.
Figure 4:
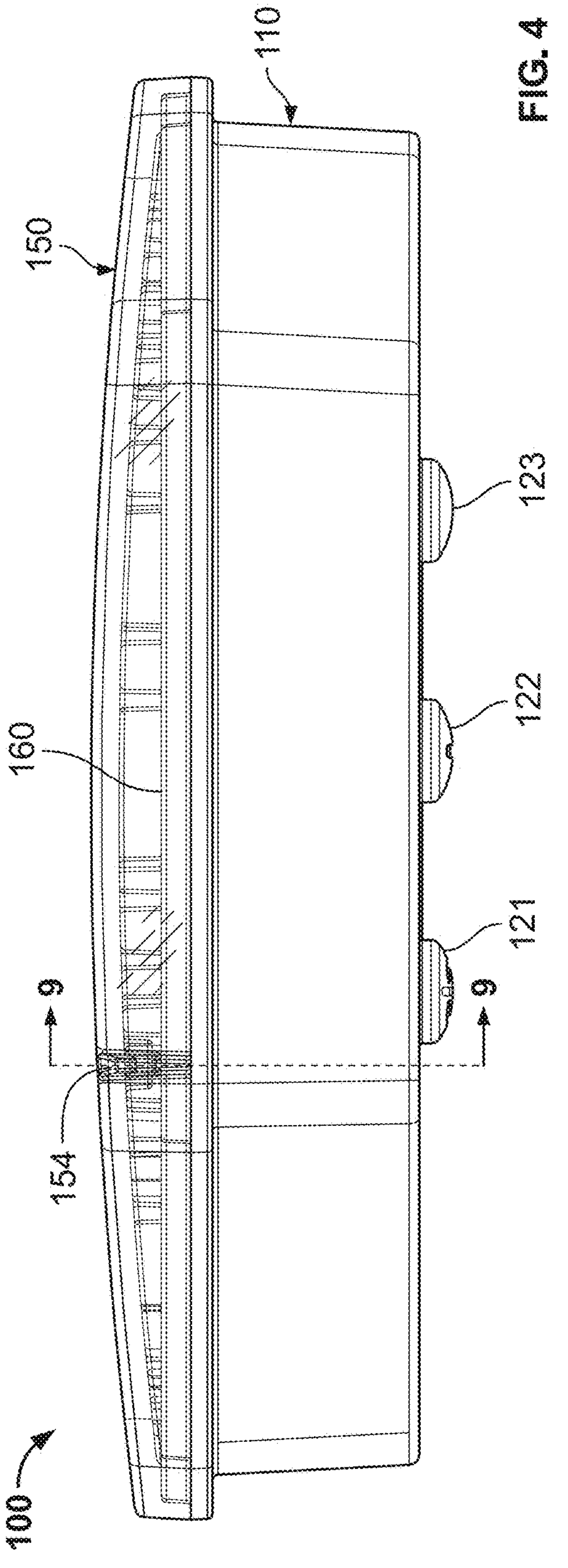
FIG. 4 illustrates a top plan view of an alert device, according to embodiments.
Figure 5:
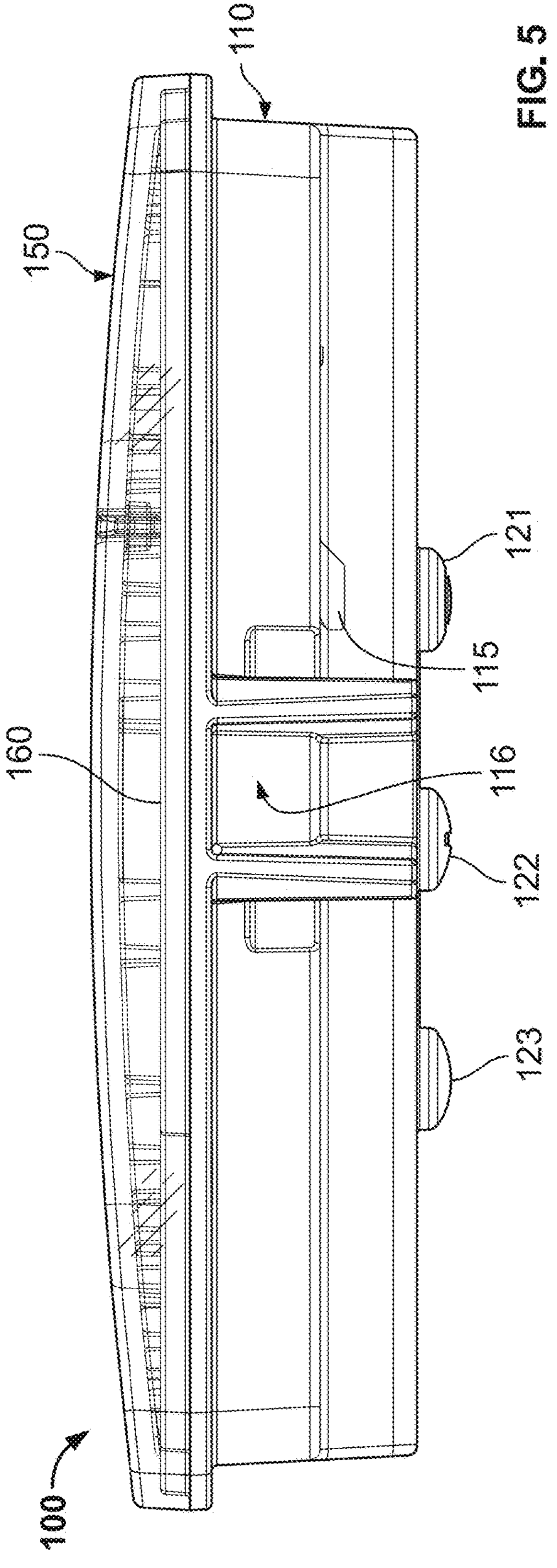
FIG. 5 illustrates a bottom plan view of an alert device, according to embodiments.
Figure 6:
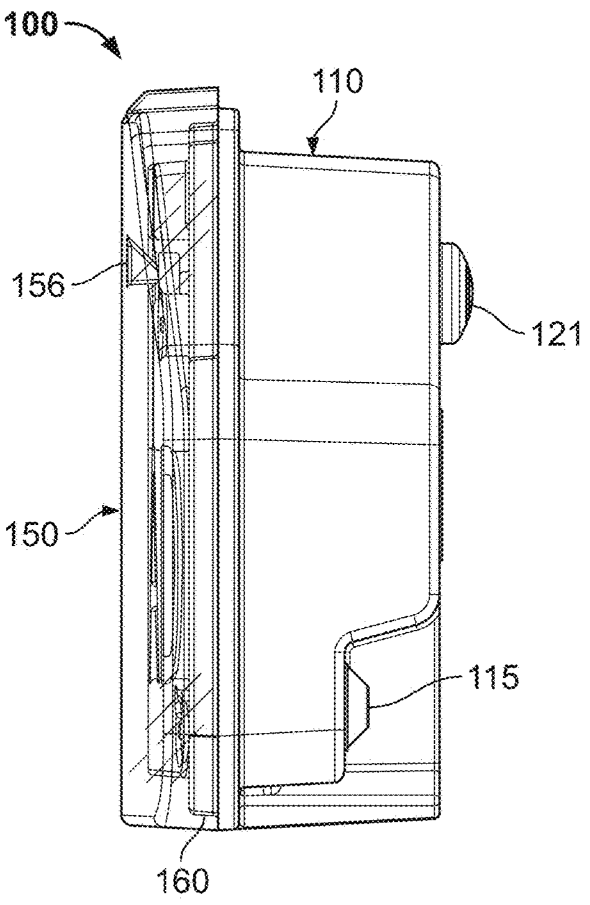
FIG. 6 illustrates a left elevation view of an alert device, according to embodiments.
Figure 7:
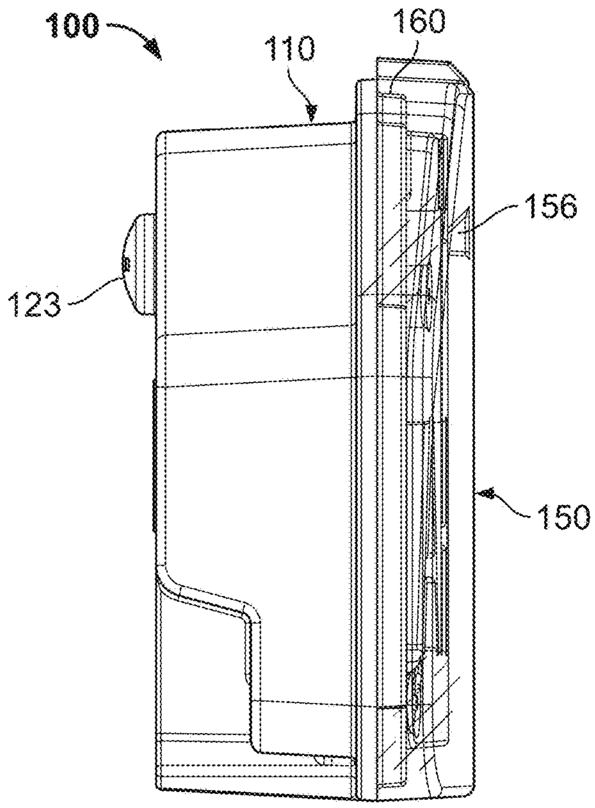
FIG. 7 illustrates a right elevation view of an alert device, according to embodiments.

FIG. 1 illustrates alert device 100 mounted to snowmobile 10, according to embodiments. Alert device 100 is mounted to snowmobile 10 using mount (not shown). As shown in FIG. 3, alert device 100 may include engagement feature 116 (see FIG. 3) to which mount engages with a corresponding engagement feature 116. Such engagement feature 116 may include Picatinny rails. Mount may mount or attach to the windshield, handlebar, hood, or other suitable location(s) on snowmobile 10. Mount may mount or attach to snowmobile 10 using a mounting feature, such as a suction cup, adhesive, magnet, clamp, and/or mounting screws.

Figure 10:
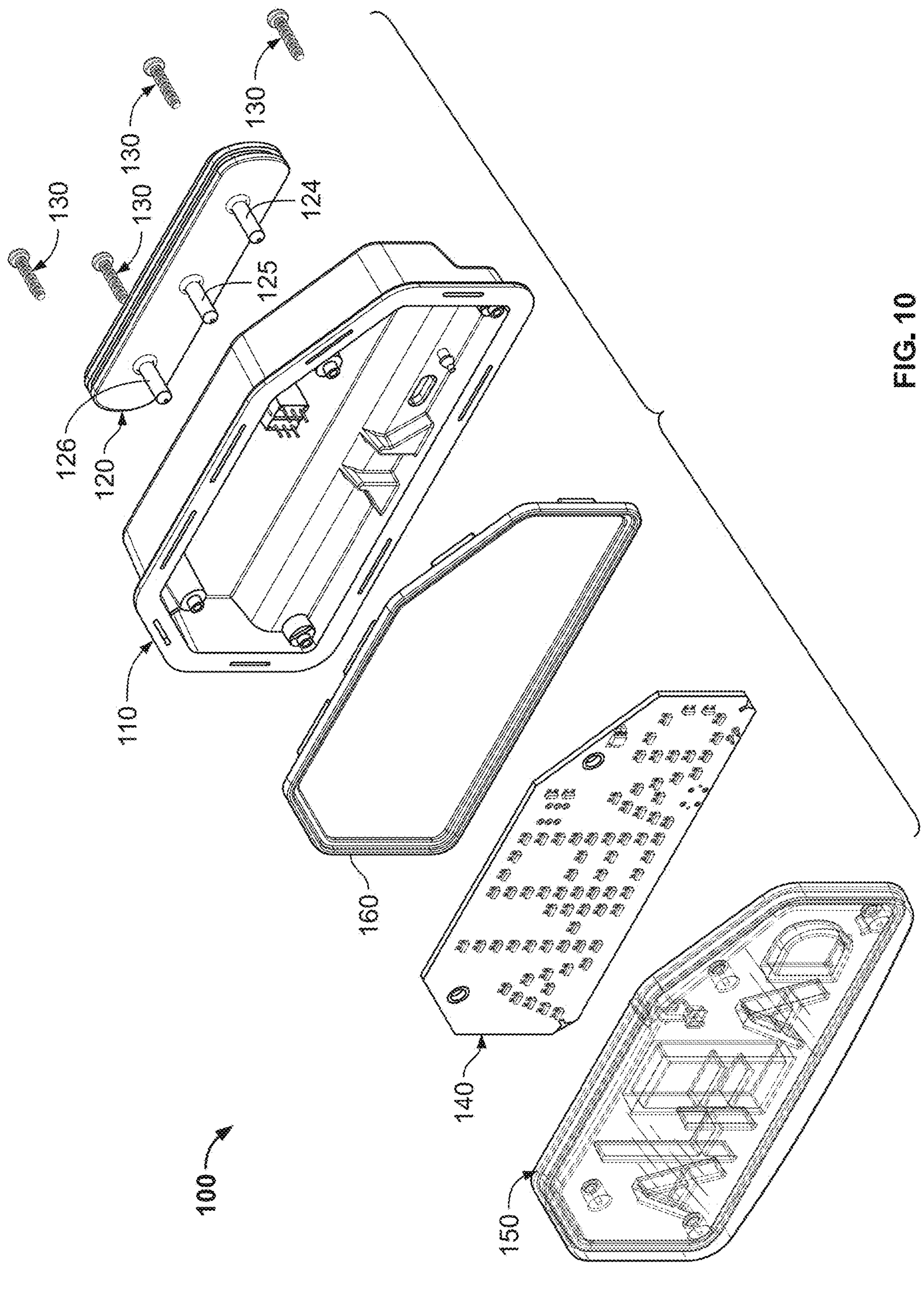
FIG. 10 illustrates an exploded view of a body and a seal overmold of an alert device, respectively, according to embodiments.
Figure 11A:
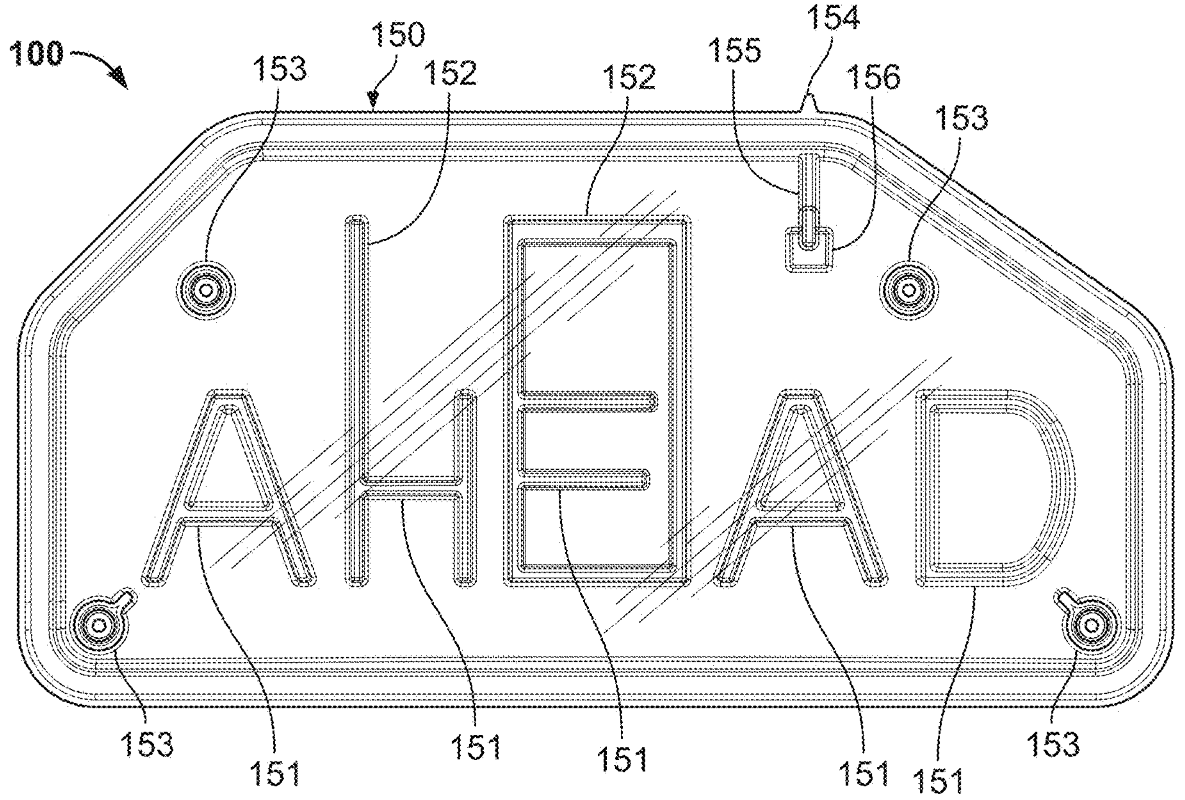
FIGS. 11A and 11B illustrate front and rear views of a lens of an alert device, respectively, according to embodiments.
Figure 11B:
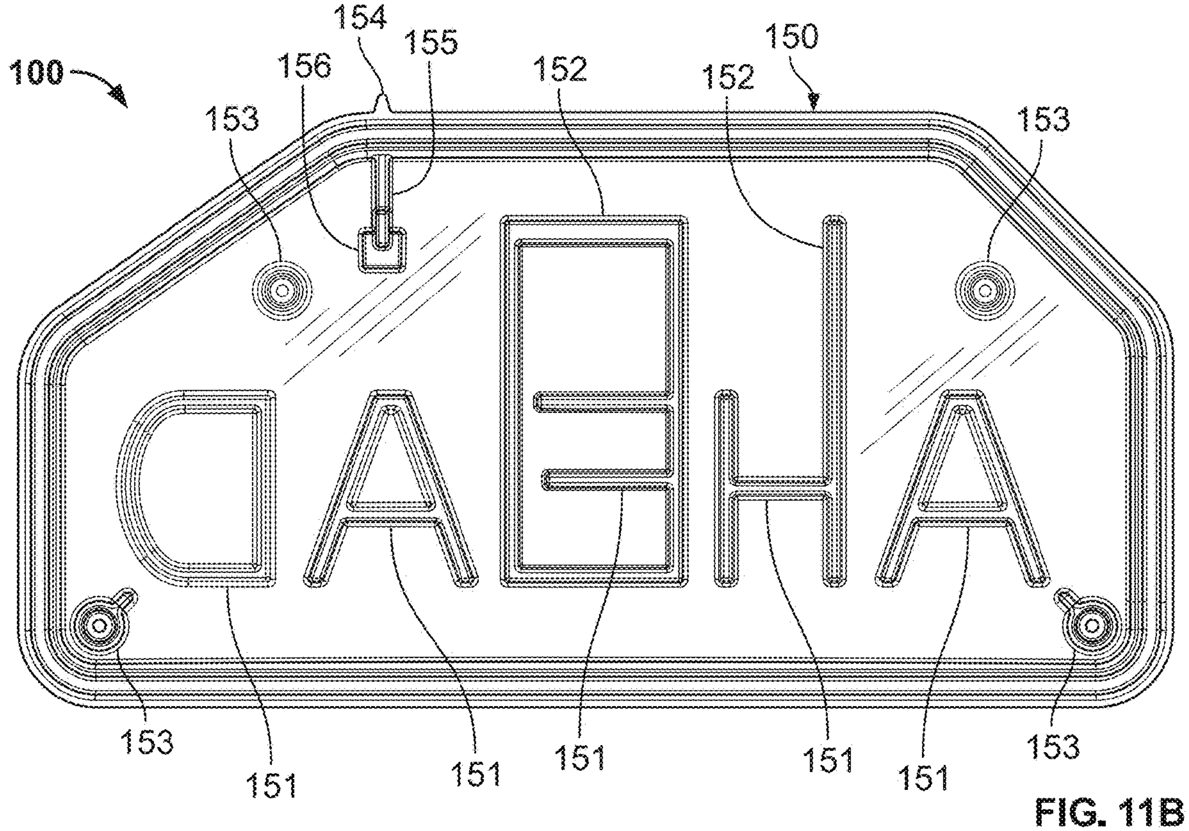

FIGS. 2-9 illustrate different views of alert device 100, according to embodiments, and as described above. FIG. 10 further illustrates an exploded view of body 110 and seal overmold 114 of alert device 100, according to embodiments. In the FIG. 10 embodiment, seal is shown as 160. FIGS. 11A and 11B illustrate front and rear views of lens 150 of alert device 100, according to embodiments. Alert device 100 includes body 110, user interface 120, lens 150, circuit board 140 (with components mounted thereto), and connectors 130. Additional components may not be shown, such as one or more batteries. Batter(ies) may be located in an interior region of alert device 110. One or more parts may be integrated with each other, such as body 110 and user interface 120. Or one or more parts may be separable into different components, such as body 110 and seal overmold 112, where seal overmold 112 may be separable into gasket 160, as shown in FIG. 10. Alert device 100 may be substantially waterproof or water-resistant. Alert device 100 may be suitable for operation in relatively challenging environments, such as a moist and cold environment often encountered on and around snowmobile 10.

Figure 8:
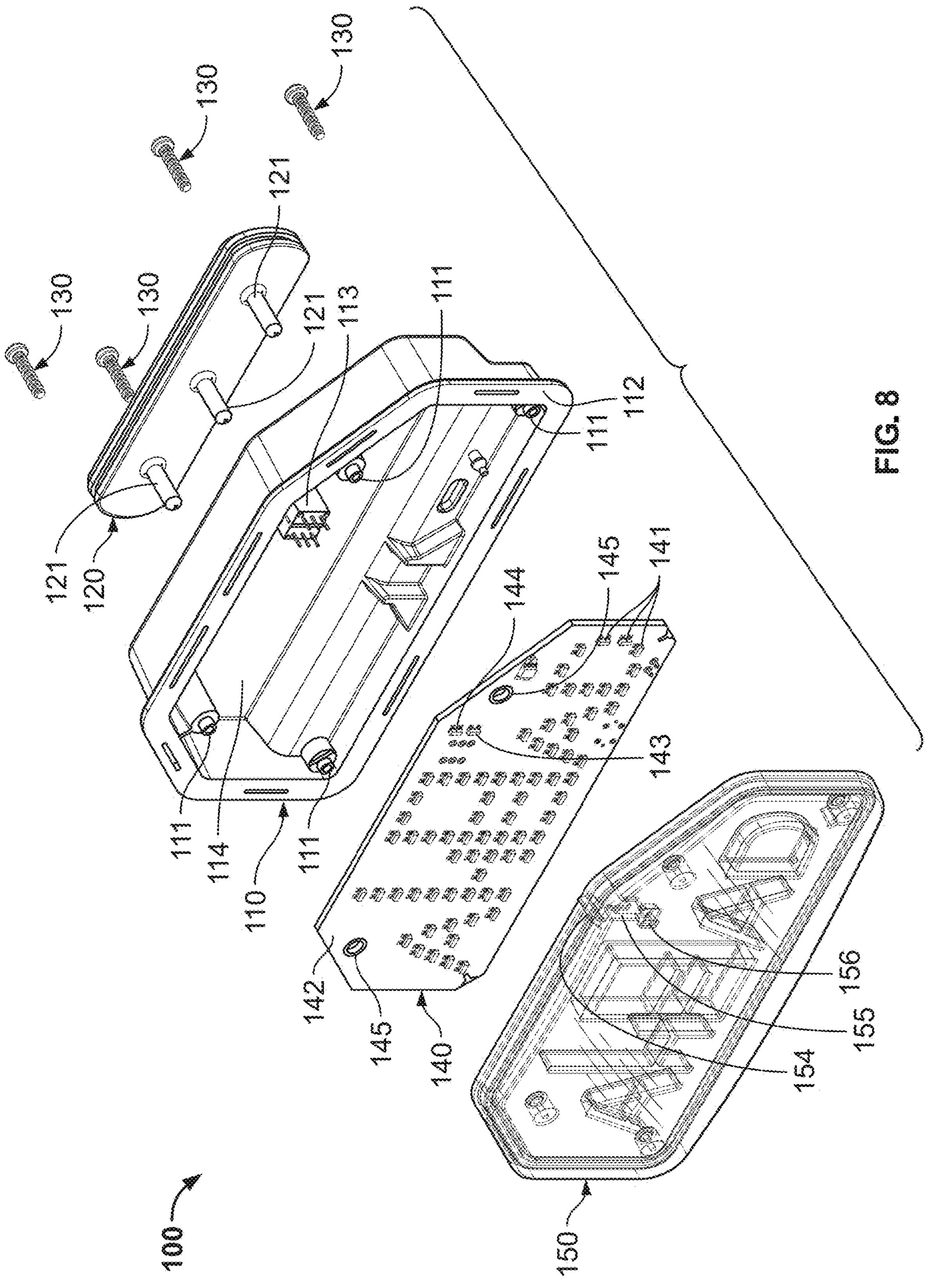
FIG. 8 illustrates an exploded view of an alert device, according to embodiments.
Figure 9:
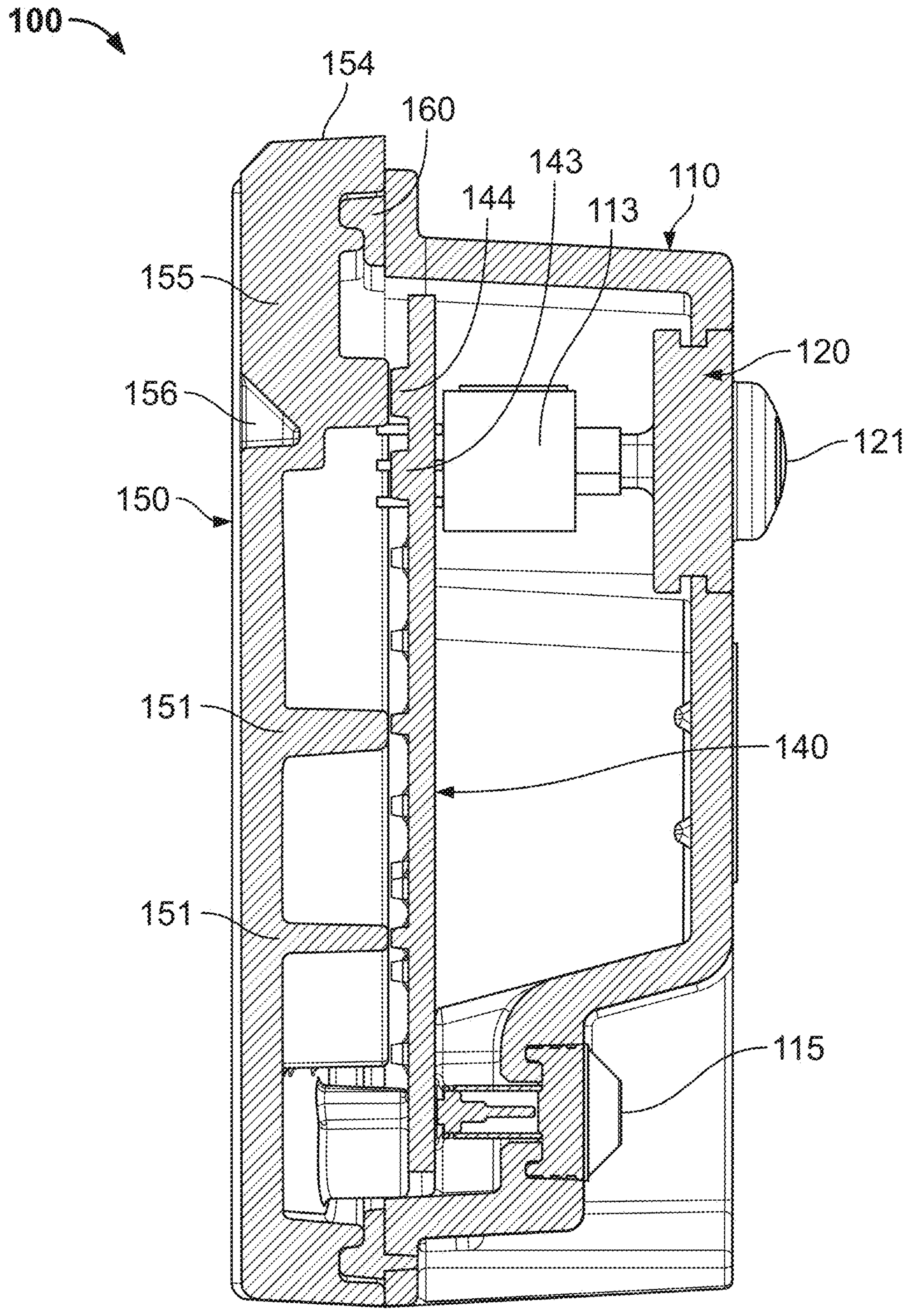
FIG. 9 illustrates a cross-section view of an alert device, according to embodiments.

Body 110 may have a generally trapezoidal shape, such as one that generally resembles certain snowmobile windshield shapes. The primary portion of body 110 may be formed of a material, such as aluminum, or thermoplastics. Body 110 includes outer surface, a portion of which faces the driver, and inner surface, which is opposite outer surface. Body 110 may include one or more overmold portions, such as logo overmold and seal overmold (not shown). Overmold portions may be made of a different material, such as thermoplastic elastomer. Overmold portions may be integrated with the primary portion of body 110. Seal overmold may be a separate component, such as gasket 160 as shown in FIG. 10. Seal overmold (or gasket 160) may engage with lens 150 and/or circuit board 140 to form a substantially water-resistant seal to prevent moisture from entering an interior region of alert device 100. As shown in FIG. 8, body 110 may include rim 112 on a frontward facing side of body 110. A plurality of slots may be arranged around rim 112. The slots may engage with a corresponding plurality of tabs on seal overmold or gasket 160. Body 110 may further include posts 111 with through-holes to accept connectors 130 (e.g., screws). Body 110 may further include an aperture on the rear surface to accommodate user interface 120. Body 110 may define an interior region 114. Body 110 may further include a charging port door 115 (e.g., a rubber flap that covers and protects a charging port, such as a USB-C port), described above with respect to FIG. 1. Charging port door 115 may be a separate portion, and may be flexible. The charging port itself may be located on circuit board 140, and may project at least partially into an aperture in body 110 when alert device 100 is assembled. The charging port may receive a charging cable from an external source to charge the batter(ies).

User interface 120 may include a plurality of features that permit a user to engage with alert device 100. User interface 120 may be made of a material such as thermoplastic elastomer. The features may be pushbuttons. FIG. 3 shows three such pushbuttons, 121, 122, 123. Pushbutton 121 (e.g., a power button) is configured to toggle the operational state of alert device 100 to ON or OFF, or to wake alert device 100 from sleep. Any feature of user interface 120 (e.g., any one of or combination of pushbuttons 121, 122, 123) may act as a power button or switch to turn alert device 100 ON, or to wake alert device 100 from sleep. Even when OFF, alert device 100 may still be operating (e.g., to sense user interaction such as interaction with pushbutton 121, or accelerometer). Pushbutton 121 may only turn ON/OFF certain aspects of alert device 100 (e.g., display 141), and may not effect other operations or power statuses of alert device 100. According to an embodiment, pushbutton 121 may be held down for an extended period of time (e.g., three, four, or five seconds) to fully turn alert device 100 ON and/or OFF. Pushbutton 122 is configured to cause the number illuminated on display 141 to increase (e.g., increase by one, each time pushbutton 122 is pressed by the user). As described herein, display 141 refers to the LEDs in some or all of the word "AHEAD" and the numbers segments. Pushbutton 123 is configured to cause the number illuminated on display 141 to decrease (e.g., decrease by one, each time pushbutton 123 is pressed by the user). Holding either of pushbuttons 122 or 123 down for a longer period of time (e.g., two seconds) may cause the number illuminated on display 141 to increase or decrease (respectively) multiple times until the given pushbutton is released. Each pushbutton 121, 122, 123 may include a corresponding extension 124, 125, 126 on the opposite side of user interface 120. Extensions 124, 125, 126 may engage with switches on circuit board 140. Although embodiments herein disclose pushbuttons, such features of the user interface 120 may be other types of features, such as toggle switches, touch sensors, or the like.

Circuit board 140 and components thereon (hereinafter, circuit board 140) may have a trapezoidal shape to match that of body 110. Circuit board 140 may include switches arranged to receive extensions 124, 125, 126. Switches may be connected electrically to processor (not shown), which may affect a given operation associated with a given switch 121, 122, 123. Circuit board 140 may include circuit board itself 142 and a display 141, such as an arrangement of LEDs. LEDs may have a color, such as white or red. The LEDs may be low power, may have attention blinking patterns, and/or may be multi-colored. The operation of display 141 is further described with respect to FIGS. 12A, 12B, 13A, and 13B. While display 141 is shown, other types of display are possible, such as an LCD display. Circuit board 140 may further include status indicators, including for example, status indicators 143, 144 (e.g., LEDs). Status indicator 143 (e.g., green LED) may indicate that the batter(ies) of alert device 100 are substantially fully charged. Status indicator 143 may turn off when a charging cable is removed from charging port. Status indicator 144 (e.g., red LED) may indicate that the battery is low (e.g., 25% of charge). Status indicator 144 may flash when the battery is particularly low (e.g., 5% of charge). Status indicators 143, 144 may indicate to a user the status of the battery. Circuit board 140 may further include through-holes 145 that receive some or all of connectors 130 and/or posts 111.

An accelerometer (not shown) may be provided on circuit board 140. The accelerometer (or inertia switch) may be in electrical communication with processor, which may put alert device 100 in sleep mode when no motion is detected for a period of time (e.g., five seconds). This may conserve battery charge. Further, one of indicators 143, 144 (or a separate indicator) may indicate to the operator that alert device 100 is in sleep mode. Such an indication may be a pulsing light or swelling light, such as a slow pulse or swell. Once movement through the accelerometer is sensed or the input buttons are pressed the alert device 100 may wake up from sleep mode. If no motion is detected via the accelerometer for an extended period of time (e.g., three hours), the alert device 100 may shut down. In such a case, to turn the alert device 100 ON, a user may interact with the user interface 120, such as by pressing pushbutton 121 or interacting with any other pushbutton or feature of the user interface 120. When the alert device 100 is shut down, a change in signal from the accelerometer may not cause the alert device 100 to power up. The time thresholds for entering sleep mode and/or shutting down may be adjustable, for example, adjustable by a user interacting with features of the user interface 120.

LEDs of display 141 may be arranged to display dedicated letters (e.g., "AHEAD") and numbers. The letters and numbers may be formed in segments. A first group of segments may correspond to the numbers and a second group of segments may correspond to the letters. The first group and second group of segments may overlap. The numbers and some of the letters may overlap. For example, the 10s (ten-s) digit of the number may overlap with the letter "H". Further, the 1s (one-s) digit of the number may overlap with the letter "E". The letters and numbers may not illuminate at the same time. As shown, the numbers may be taller than the letters. Illumination of LEDs may be controlled by processor, which may also control all operations on alert device 100.

Lens 150 (shown in more detail in FIGS. FIGS. 11A and 11B) may include receiving regions 153 (e.g., female threaded regions) that are configured to receive connectors 130. Lens 150 may be formed of a material such as thermoplastic. Lens 150 may be transparent or opaque or translucent, or opaque or translucent in some regions while transparent in other regions. Lens 150 may include a region 156 (e.g., a recessed region), through which light from status indicator 143 can be viewed. Lens 150 may include various light pipes 151, 152, 155, which may pipe light from display 141 to an exterior surface of lens 150. The areas where light is piped to the surface of lens 150 may not be opaque or translucent (i.e., may be transparent), such that light from display 141 is readily visible to a viewer. In some cases lens 150 may be transparent or slightly translucent. A texture may be added to an outer surface of lens 150 to create opacity or translucency, such as a "frosted" appearance. Such texture may be added by mechanical means, such as buffing. The texture may or may not be added over the light pipes 151, 152. Such opacity or translucency may obscure other components behind lens 150, such as circuit board 140. Light pipes 151, 152 may pipe light emitted from the letter patterns of display 141 to the outer, forward-facing surface of lens 150. Light pipes 152 may pipe light emitted from the number patterns of display 141. Again, numbers and letters may overlap, and in such a case, light pipes 151, 152 may overlap in regions (e.g., be indistinct the overlapping regions). Indicator region 154 may extend upwardly in an upper region of lens 150. Indicator region 154 may be in optical communication with light pipe 155, which may pipe light from indicator 144 (e.g., low battery indicator). In this manner, light emitted from indicator 144 may be piped to an indicator region in an upper surface or region of lens 150, such that the operator of vehicle 10 can see the indicator (e.g., see that the battery is low). Other indicators (e.g., LEDs, corresponding light pipes, and corresponding indicator regions) may be possible and viewable in such a manner, such as status indicator 143. Indicator region 154 may be transparent. While indicator region 154 may be suitably located in any region of lens 150 that is viewable to the vehicle operator when operating the snowmobile 10. Corresponding light pipe 155 may be arranged to facilitate the positioning of indicator region 154 and indicator 144.

Figure 12A:
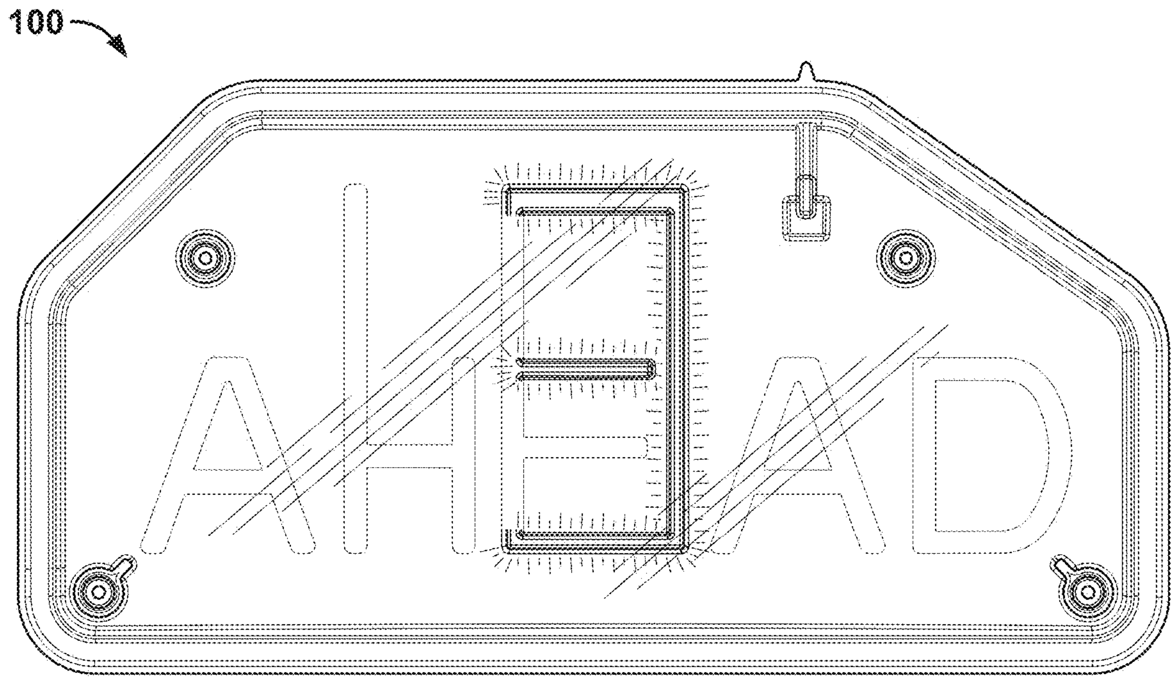
FIGS. 12A and 12B illustrate two views of an animated display of an alert device, according to embodiments.
Figure 12B:
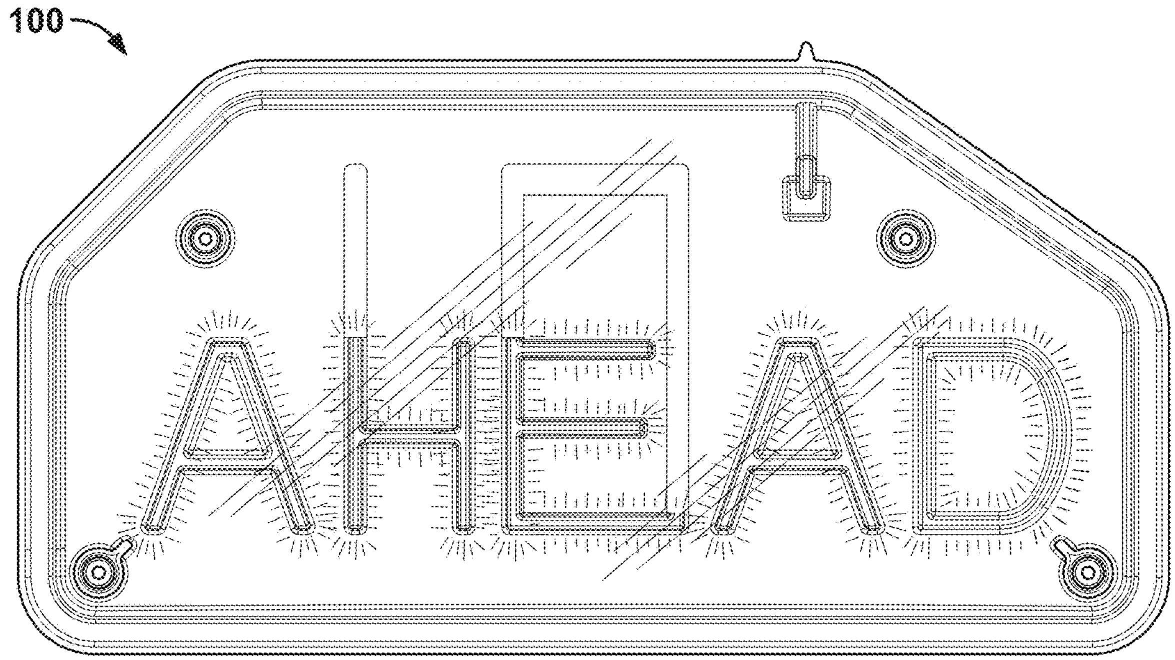
Figure 13A:
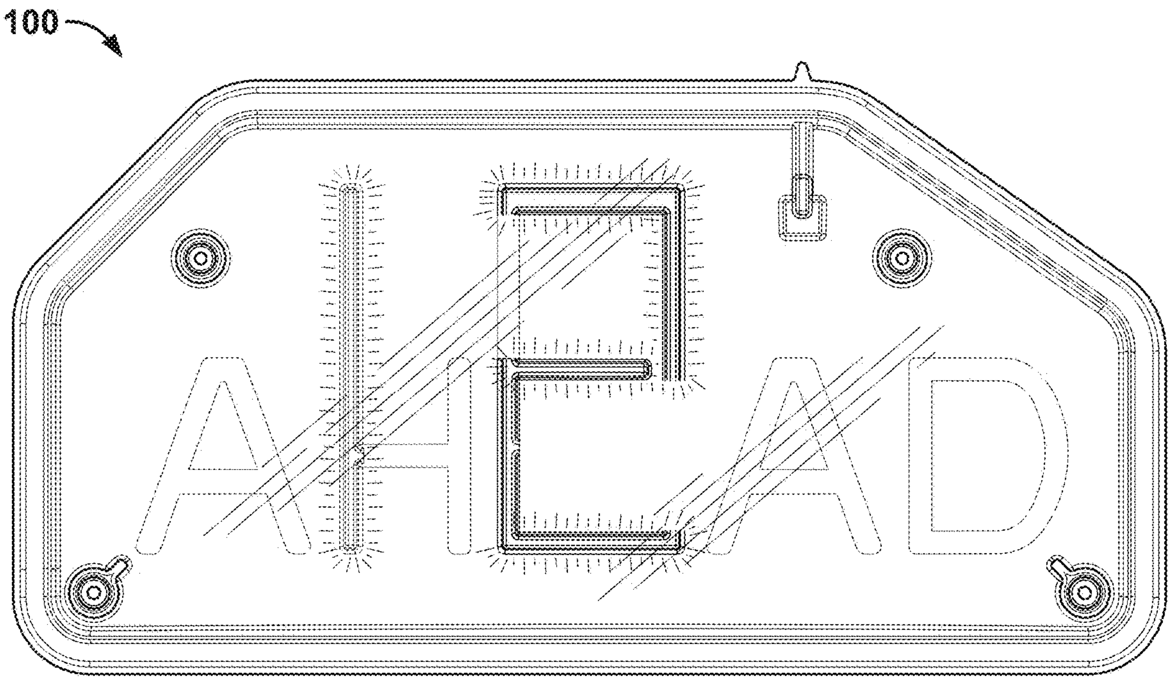
FIGS. 13A and 13B illustrate two views of an animated display of an alert device, according to embodiments.
Figure 13B:
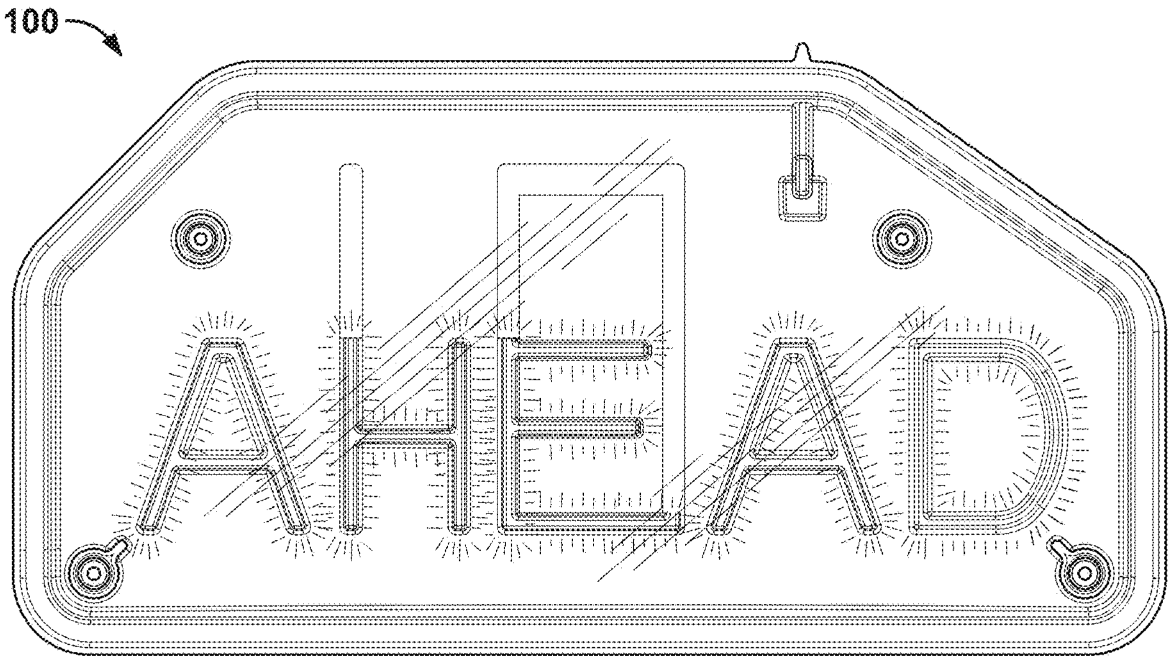

FIGS. 12A, 12B, 13A, and 13B show an operation of alert device 100 at a forward-facing surface of lens 150. As shown in FIG. 12A, a number is displayed ("3") for a duration (e.g. 1-2 seconds), and subsequently. Subsequently, as shown in FIG. 12B, the word "AHEAD" is displayed for a duration (e.g. 1-2 seconds). The durations that the letters and numbers are displayed may be the same, such as 1 seconds. The number may be changed using increment/decrement buttons 122, 123. As shown in FIG. 13A, the number may be changed to "12" or any other suitable number. Further, while as shown the maximum number is 19, it is possible to have different arrangements of LEDs to increase the maximum to a larger suitable number (e.g., 29 or 39). In another embodiment, a 100s digit may be added, totaling three digits. In FIG. 13B, after the number "12" is displayed, the word "AHEAD" is displayed. In all or some embodiments, the digits may overlap letters.

In addition to the animation of display 141 described, display 141 may flash relatively rapidly to increase attention. For example, the number may quickly flash and/or the letters may quickly flash. Further, display 141 may illuminate to give a scrolling or wiping effect. Intensity of display 141 may vary, for example, in order to provide a fading effect. Further, color-changing LEDs may be employed to provide different colors. For example, the numbers could be displayed in a first color, while the letters are displayed in a second color.

Alert device 100 may include other features, such as a light sensor and associated functionality. A light sensor may measure ambient light, and cause display 141 to illuminate at different brightness according to the level of ambient light. For example, if there is more ambient light, display 141 may be caused to emit light that is brighter.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. An apparatus for mounting on a vehicle, wherein the apparatus is further for alerting an oncoming vehicle operator as to a presence of a certain number of additional vehicles behind the vehicle, wherein the apparatus defines a forward-facing direction corresponding to forward direction of the vehicle and a rearward-facing direction opposite the forward-facing direction, the apparatus comprising:

a body including an upward-facing side and an rearward-facing side;

a processor configured to receive power from a battery;

a display including a first group of segments and a second group of segments, wherein each of the segments comprises an LED, wherein the display is configured to receive power from the battery and to receive signals from the processor, wherein the signals dynamically control an illumination pattern of the segments, wherein the first group of segments is configured to illuminate patterns of the segments corresponding to different numbers, wherein the second group of segments is configured to illuminate a pattern of the segments corresponding to at least one word, wherein the first group of segments and the second group of segments are configured to illuminate towards the forward-facing direction;

a lens, wherein the body and the lens form an interior region of the apparatus, wherein the processor and the display are located in the interior region of the apparatus; and a user interface, wherein the user interface communicates with the processor and is configured to control the display, wherein the user interface is located in or on the body.

2. The apparatus of claim 1, further comprising a mount configured to attach to the vehicle, wherein the body is coupled with the mount such that a position of the body is adjustable with respect to the vehicle.

3. The apparatus of claim 1, wherein at least one segment in the first group of segments is shared with the second group of segments.

4. The apparatus of claim 1, wherein a height of the first group of segments is greater than a height of the second group of segments.

5. The apparatus of claim 1, wherein the signals cause the first group of segments and the second group of segments to illuminate in an alternating manner.

6. The apparatus of claim 5, wherein the first group of segments and the second group of segments alternate at a period, wherein the period is no longer than approximately one second per group.

7. The apparatus of claim 1, wherein the lens further includes a display light pipe configured to direct light from the display to a forward-facing surface of the lens.

8. The apparatus of claim 1, wherein the lens further includes a power indicator light pipe configured to direct light from the power indicator to an upward-facing surface or a rearward-facing surface of the lens.

9. The apparatus of claim 1, wherein the lens comprises an opaque region in a region where there is no light pipe, wherein the opaque region is configured to obscure an appearance of structure behind the lens.

10. The apparatus of claim 9, wherein the lens is textured to form the opaque region.

11. The apparatus of claim 1, wherein the user interface is disposed on the rearward-facing side of the body.

12. The apparatus of claim 1, wherein the user interface comprises a power button configured to selectively turn the display ON or OFF.

13. The apparatus of claim 1, wherein the user interface comprises a number-adjusting interface configured to cause the processor to communicate signals to the display to adjust the pattern displayed on the first group of segments such that an adjusted number is displayed.

14. The apparatus of claim 13, wherein the number-adjusting interface comprises an increment button and a decrement button.

15. The apparatus of claim 1, further comprising a light sensor configured to detect an amount of ambient light and correspondingly adjust a brightness level of the display.

16. An apparatus for mounting on a vehicle, wherein the apparatus is further for alerting an oncoming vehicle operator as to a presence of a certain number of additional vehicles behind the vehicle, the apparatus comprising:

a mount configured to attach to the vehicle, wherein the mount is adjustable;

a body coupled with the mount such that the body is adjustable with respect to the vehicle, wherein the body includes an upper side and an operator-facing side;

a processor configured to receive power from a battery;

a display including a first group of segments and a second group of segments, wherein each of the segments comprises an LED, wherein the display is configured to receive power from the battery and to receive signals from the processor, wherein the signals dynamically control an illumination pattern of the segments, wherein the first group of segments is configured to illuminate patterns of the segments corresponding to different numbers, wherein the second group of segments is configured to illuminate a pattern of the segments corresponding to at least one word;

a power indicator;

a lens configured to cover the display, and including a display light pipe, wherein the display light pipe is configured to direct light from the display to a forward-facing surface of the lens; and a user interface disposed on a rearward-facing side of the body, wherein the user interface communicates with the processor, wherein the user interface is configured to selectively turn the display ON and OFF, wherein the user interface is configured to cause the processor to generate a signal for the first group of segments in the display to increase the number such that a different pattern is illuminated, and wherein the user interface is configured to cause the processor to generate a signal for the first group of segments in the display to decrease the number such that a different pattern is illuminated.

17. The apparatus of claim 16, further comprising a light sensor configured to detect an amount of ambient light and correspondingly adjust a brightness level of the display.

18. The apparatus of claim 16, further comprising a port configured for charging the battery.

19. The apparatus of claim 16, wherein the user interface includes a power button configured to selectively turn the display ON or OFF, an increment button configured to cause the processor to generate a signal for the first group of segments in the display to increase the number such that a pattern is illuminated, and a decrement button configured to cause the processor to generate a signal for the first group of segments in the display to decrease the number such that a different pattern is illuminated.

20. The apparatus of claim 16, wherein the lens is textured to form an opaque region.

* * * * *